United States Patent [19]
Carroll

[11] Patent Number: 5,420,684
[45] Date of Patent: May 30, 1995

[54] RESONANT INTERFEROMETER FIBER OPTIC GYROSCOPE

[75] Inventor: Raymond Carroll, Andover, Mass.

[73] Assignee: The Charles Stark Draper Laboratory, Inc., Cambridge, Mass.

[21] Appl. No.: 455,167

[22] Filed: Dec. 22, 1989

[51] Int. Cl.$^6$ .................... G01B 9/02; H01S 3/083
[52] U.S. Cl. ........................ 356/350; 372/94
[58] Field of Search ............... 356/350; 372/94

[56] References Cited

U.S. PATENT DOCUMENTS

| | | | |
|---|---|---|---|
| 4,274,742 | 6/1923 | Lustig . | |
| 4,445,780 | 5/1984 | Burns . | |
| 4,491,413 | 1/1985 | Rashleigh . | |
| 4,661,964 | 4/1987 | Haavisto . | |
| 4,662,751 | 5/1987 | Goss et al. | 356/350 |
| 4,702,600 | 10/1987 | Hendrich . | |
| 4,755,051 | 7/1988 | Cahill et al. | 356/350 |
| 4,825,261 | 4/1989 | Schroeder | 356/350 |

OTHER PUBLICATIONS

"Single-Mode Optical Fiber Resonator and Applications To Sensing", Loren Frank Stokes, G.L. Report No. 3620, Edward L. Ginzton Laboratory, W. W. Hansen Laboratories of Physics, Stanford University, Sep. 1983.

"Passive Ring Resonator Method for Sensitive Inertial Rotation Measurements in Geophysics and relativity'-'—Sanders, et al. Optical Society of America, vol. 6, No. 11/Nov. 1981 Optics Letters.

"Techniques for Shot-Noise-Limited Inertial Rotation Measurement Using a Multiturn Fiber Sagnac Interferometer"—Davis et al Laser Inertial Rotation Sensors (1978) SPIE Vo. 157.

"Technology Assessment of Passive Optical Gyros Part I and Overview of Concepts Problems, and Approaches Part II",—J. David Coccoli, The Charles Stark Draper Laboratory, Inc. Cambridge, Massachusetts, Sep. 1982.

"Fiber Optic Laser Byro Signal Detection and Processing Technique"—Martin et al—Guided Wave Optical Systems and Devices (1978) SPIE vol. 139.

*Primary Examiner*—Stephen C. Buczinski
*Attorney, Agent, or Firm*—Lappin & Kusmer

[57] ABSTRACT

A passive resonator gyroscope in which a laser beam is split into two equal intensity beams in a waveguide, each of the beams being coupled to counterpropagate around a fiber optic ring. The beams, after splitting, are frequency modulated with a voltage having a serrodyne waveform, the polarity of the voltage applied to the modulator for the one beam being opposite to the polarity of the modulating voltage applied to the modulator for other beam. The laser frequency is locked to the optical cavity half wave resonant frequency and when the laser is so locked, the modulating voltage is applied for a first period with one polarity and then for a second period of the same duration with the opposite polarity. The output beams from the optical fiber ring are combined in the waveguide and a portion of the combined optical beam is provided to a photodetector. A circuit connected to the photodetector determines the difference between the light impinging upon the photodetector during the first period and during the second period, this difference providing a measure of the Sagnac shift produced by the rotation of the fiber optic ring.

13 Claims, 5 Drawing Sheets

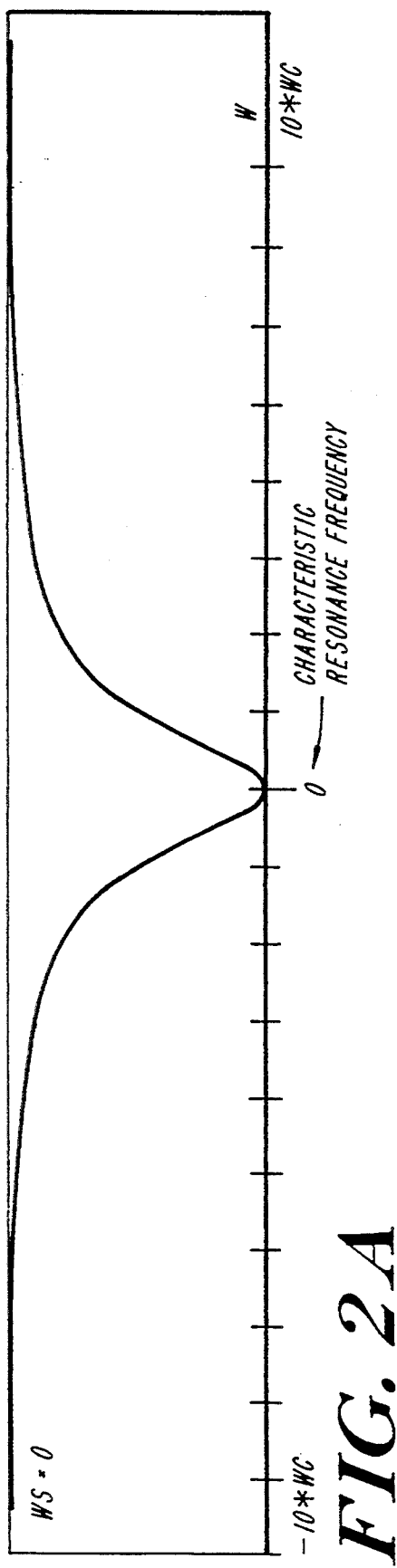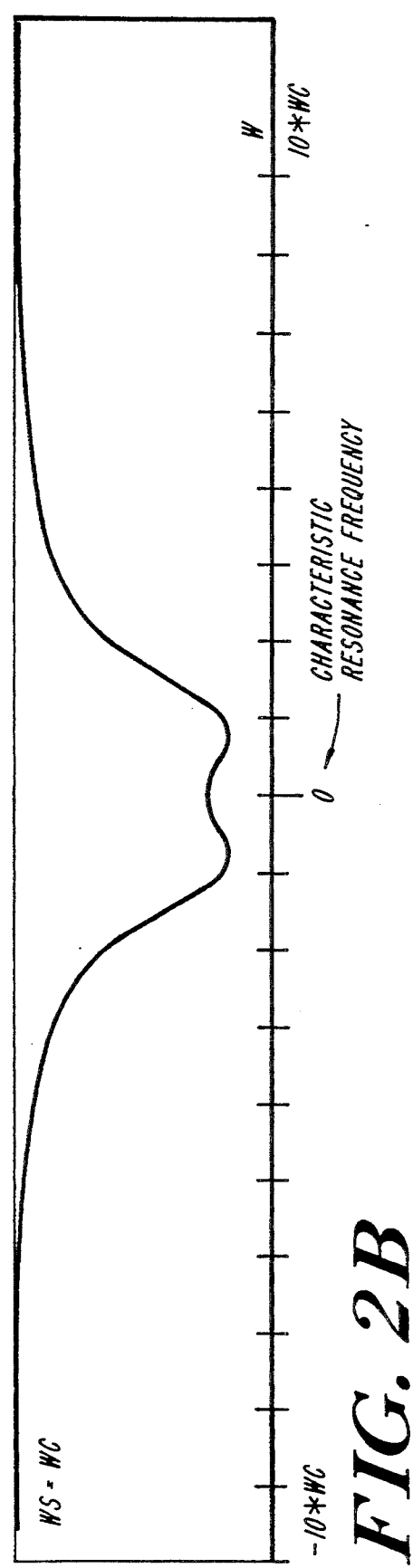

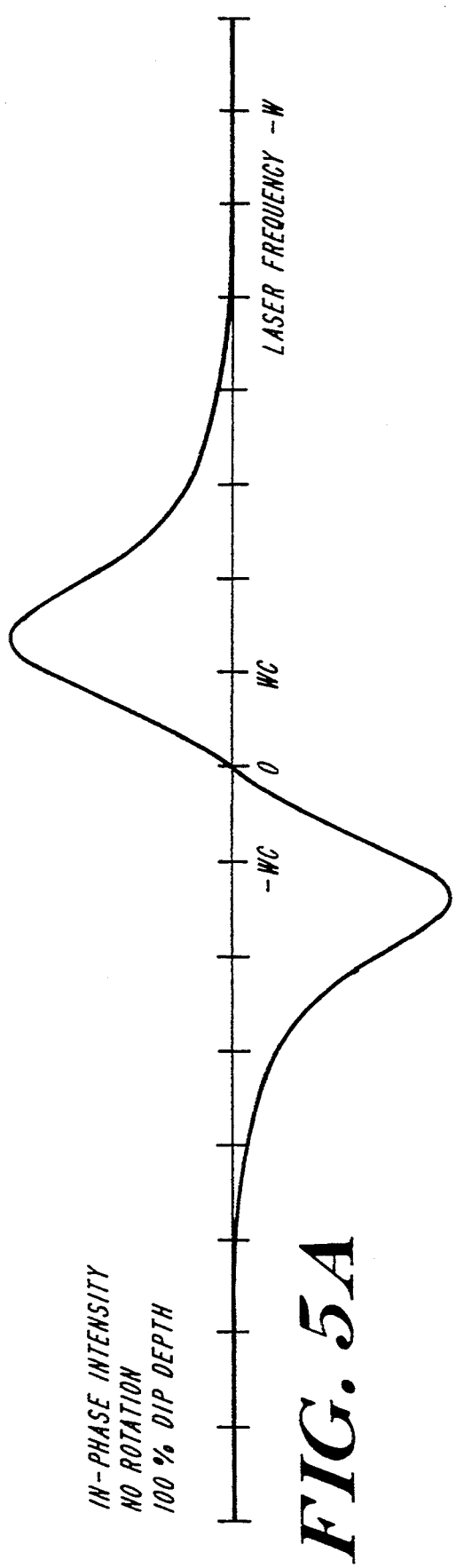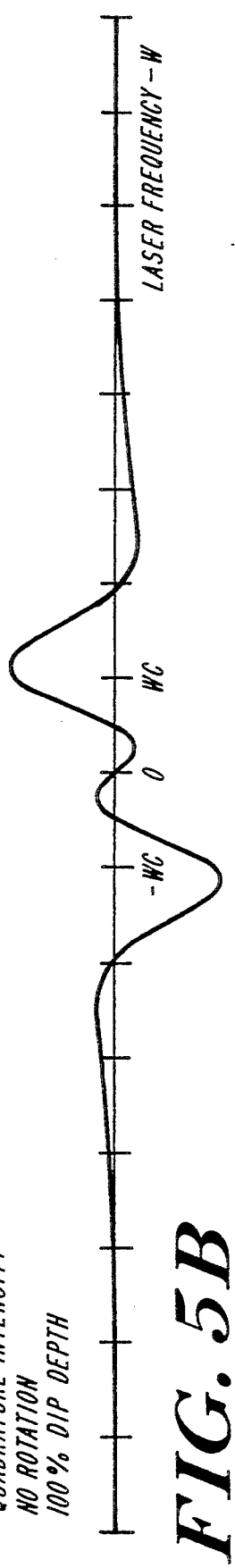

RESONANT INTERFEROMETER FIBER OPTIC GYROSCOPE

BACKGROUND OF THE INVENTION

This invention relates in general to fiber optic ring gyroscopes and more particularly to a passive resonance ring gyroscope configured to have high common mode noise rejection.

The use of fiber optic rings in either interferometer systems or passive resonance systems for the measurement of angular rotation rates is now a well developed technology. Both types of system depend upon measuring the Sagnac shift produced by rotation of the ring, and employ laser beams coupled to the ring such that they travel around the ring in opposite directions to establish the basic interference or resonance pattern. Different variations of such systems are discussed in the following references.

| U.S. Pat. No. | Issue Date |
| --- | --- |
| U.S. Pat. No. 4,274,742 | June 23, 1981 |
| U.S. Pat. No. 4,491,413 | January 1, 1985 |
| U.S. Pat. No. 4,661,964 | April 28, 1987 |
| U.S. Pat. No. 4,673,293 | June 16, 1987 |
| U.S. Pat. No. 4,702,600 | October 27, 1987 |

"*Fiber Optic Laser Gyro Signal Detection and Processing Technique*" by Martin and Winkler, SPIE Vol. 139, Guided Wave Optic Systems and Devices (1978), pp. 98–102;

"*Techniques For Shot-Noise-Limited Inertial Rotation Measurement Using A Multiturn Fiber Sagnac Interferometer*" by Davis and Ezekiel, SPIE Vol. 157 Laser Inertial Rotation Sensors (1978) pp. 131–136;

"*Technology Assessment of Passive Optical Gyros, Part I, Overview of Concepts, Problems, and Approaches*" by Coccoli, September, 1982;

"*Passive Ring Resonator Method for Sensitive Inertial Rotation Measurements in Geophysics and Relativity*" Saunders, Prentiss and Ezekiel, Optics Letters, Vol. 6, No. 11, pp. 569–571;

In general in a resonant fiber optic ring gyroscope a laser light source is coupled to the fiber optic ring through waveguides which provide for introducing counter propagating light beams into the fiber optic ring. Photodetectors are positioned to measure a portion of the light emanating from the ring. According to the Sagnac effect, rotation of the ring changes the effective path length for light, thereby changing the resonant frequency. If feedback is employed to maintain the frequency at a specific value, then the amplitude of the light waves emitted will vary.

A variety of configurations of passive and active fiber optic gyroscopes have been employed together with accompanying circuitry with the overall objective of increasing the signal to noise ratio. The sources of noise include fluctuations in the path length due to mechanical stresses and thermal changes, as well as noise in the electronics.

SUMMARY OF THE INVENTION

It is therefore an object of the invention to provide a resonant fiber optic gyroscope with inherent common mode rejection of light path fluctuations.

Broadly speaking, in the present invention a resonant fiber optic gyroscope is configured with light from a coherent laser injected into a waveguide beam splitter coupled to a fiber optic ring, so that light of substantially equal intensity circulates in opposite directions around the ring. The returning light beams are recombined into the original waveguide with a portion of the recombined light provided to a photodetector. The amplitude of the recombined beam consists of interference between the two counterpropagated light waves. Rotation of the fiber optic ring in a direction normal to the plane of the ring produces a Sagnac frequency shift so that the photodetector current exhibits two dips as a result of up and down shifting of the resonance frequency in response to the Sagnac shift. Phase modulators are employed to phase modulate each of the light beams after splitting. The modulating frequency is the same for both beams but has opposite polarities. The gyroscope is operated for a period of time with the frequency shift induced by the phase modulators at a positive value, and then for an equal time with the frequency shift at a negative value. The carrier intensity difference is then synchronously demodulated to provide a difference signal as indicative of the amount of rotation. During this operation the laser frequency is locked at the resonant frequency of the ring.

DESCRIPTION OF THE DRAWINGS

In the drawings:

FIG. 5 is an illustration in graphic form of output signals from the gyroscope of FIG. 1 modulated to provide means for laser tracking.

DESCRIPTION OF PREFERRED EMBODIMENTS

Figure 1:
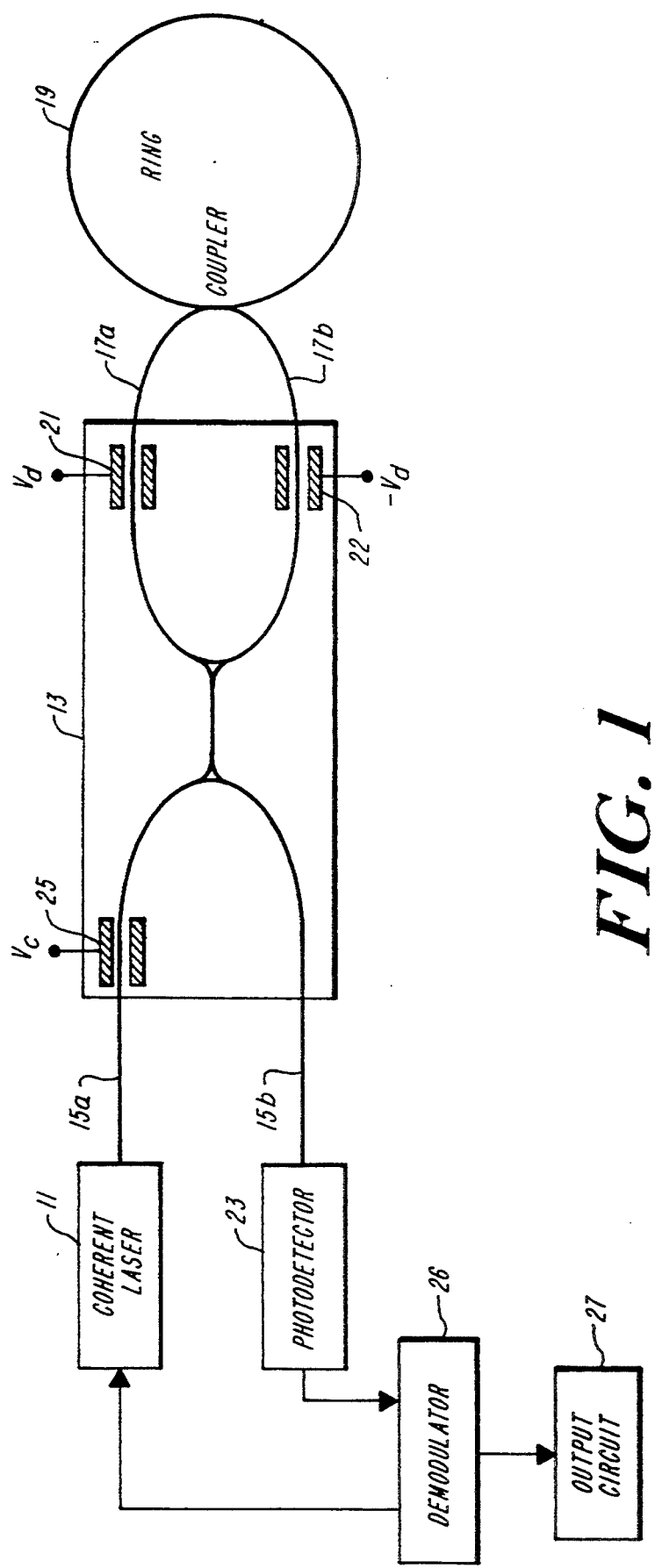
FIG. 1 is an illustration in schematic form of one embodiment of a resonant fiber optic gyroscope constructed in accordance with the principles of this invention.

In the embodiment illustrated in FIG. 1 a coherent laser 11 provides an output beam optically coupled to one input port of optical waveguide 13. The waveguide 13 splits this input beam into two equal intensity output beams, providing one of these output beams to outport port 17a and the other to output port 17b. The beam from output port 17a is coupled to a fiber optic ring 19 to propagate around it in a counterclockwise direction, while the beam from output port 17b is coupled to the fiber optic ring 19 to propagate in the opposite (clockwise) direction around the ring. A photodetector 23 is coupled to input port 15b and thus detects the variations in amplitude of the propagated light beams recombined in the waveguide 13.

Phase modulators 21 and 22 are each positioned to modulate one of the output beams to the fiber optic ring and have voltages of opposite polarity, $+V_d$ and $-V_d$ applied to them. A third phase modulator 25 is applied to the laser beam before splitting and has a modulation voltage $V_c$ applied to it.

Demodulation circuitry 26 has coupled to it the output electrical signal from photodetector 23 and serves to demodulate the signals to provide through circuit 27 an output signal indicative of the Sagnac frequency shift. It also delivers a signal to coherent laser 11 to provide for tracking of the laser frequency.

The configuration of the resonant fiber optic gyroscope illustrated in FIG. 1 may be considered as a resonant interferometric fiber optic gyro (RIFOG). The configuration of the gyroscope of FIG. 1 provides for inherent common mode rejection of light path fluctuations. As shown, the gyroscope employs a single shared input-output optical waveguide channel. This configuration reduces the common mode rejection required of the electronics in dynamic environments to produce a quieter gyroscope. The result supplies improvements in the stability and noise performance of the gyroscope.

In operation, light from the coherent laser 11 is coupled through input 15a and is split evenly in the waveguide 13 to produce a pair of equal intensity beams coupled to the fiber optic ring 19 to propagate in opposite directions around it. Returning light beams from the fiber optic ring 19 are then recombined in the same waveguide and a portion of the recombined beam is detected at photodetector 23. The amplitude of this recombined beam consists of the interference of the two light waves which have been propagated in opposite directions around the ring.

Figure 2C:
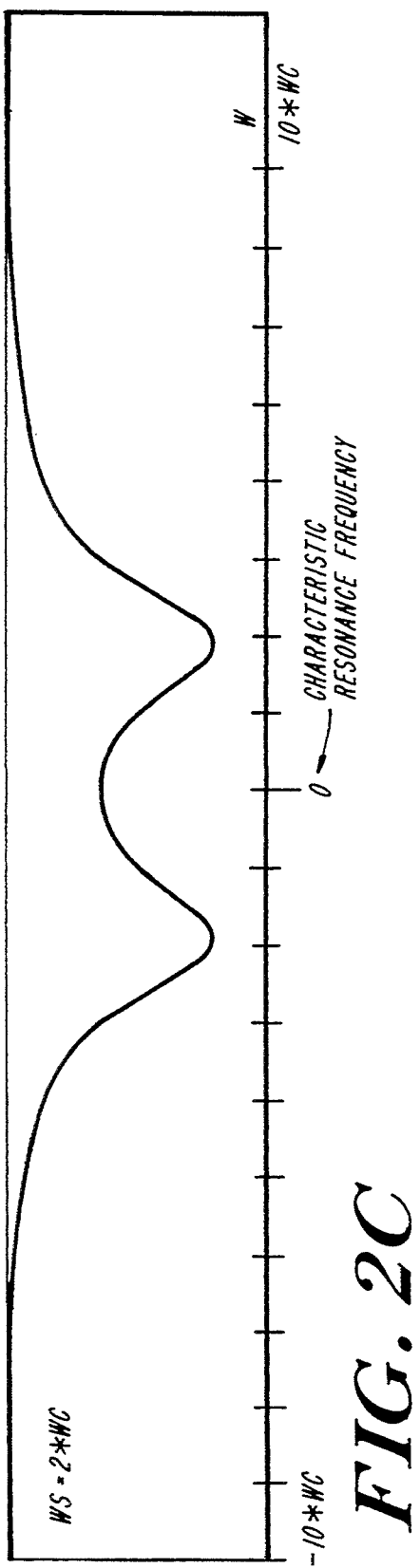
FIG. 2 is a graphical illustration of output waveforms produced by the gyroscope of FIG. 1.

In FIG. 2 there are illustrated the output waveforms produced at photodetector 23 for varying amounts of rotationally induced Sagnac shift, $\omega_s$ but without any modulation applied and with the laser frequency, $\omega$ being swept through a range of values, which includes the resonant ring cavity half width $\omega_c$. In FIG. 2a the Sagnac shift, $\omega_S$ equals 0 and the resonant dip is shown at $\omega=0$ where $\omega$ is the laser frequency relative to the resonance frequency. In FIG. 2b a Sagnac shift equal to the resonant ring cavity half width is introduced, and in FIG. 2c the Sagnac shift $\omega_S$ equal to twice the frequency $\omega_C$ is shown. The splitting of the dip is the result of the up and down shifting of the resonant frequencies in the rotating ring. As illustrated, at zero rotation this resonance produces a minimum signal.

Figure 3:
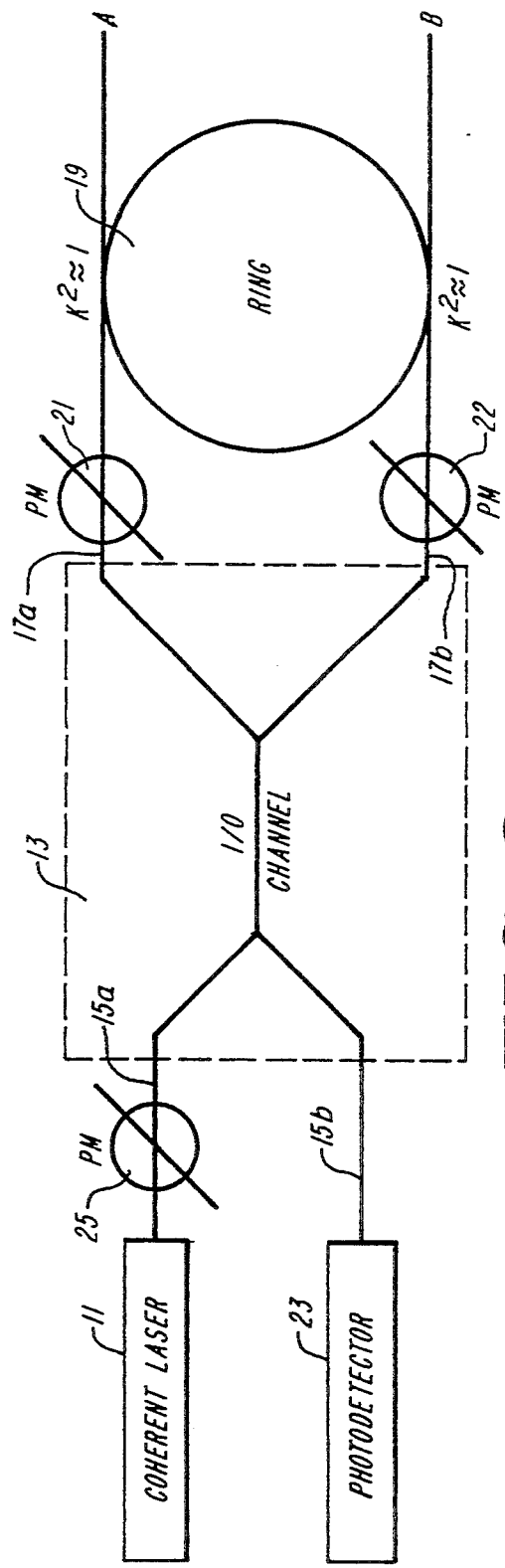
FIG. 3 is an illustration of a second embodiment of a fiber optic gyroscope constructed in accordance with the principles of this invention.

In the embodiment of FIG. 3, in which like numbers apply to like components, a configuration is shown which would produce a resonant peak.

In the embodiment of FIG. 1, as noted above, the modulators 21 and 22 can modulate each of the split output light beams before those beams are coupled to the fiber optic ring 19. A serrodyne voltage is applied to modulator 21, where the voltage is of the form, $$V_d = 2V_{90} \cdot ser(\omega_m t) \quad (1)$$

i.e.

$$V_d/2V_\pi = \omega_m t (\text{modulo } 2\pi) \quad (2)$$

where $2V_\pi$ is a reference voltage and $\omega_m$ is modulating frequency. The modulator then produces a serrodyne phase delay ramp that appears as an optical frequency shift of $f_m = \omega_m/2\pi$. A frequency shift of the same form, but opposite in direction is introduced at phase modulator 22 by applying a negative voltage $-V_d$ having the same form as equation (1).

Figure 4A:
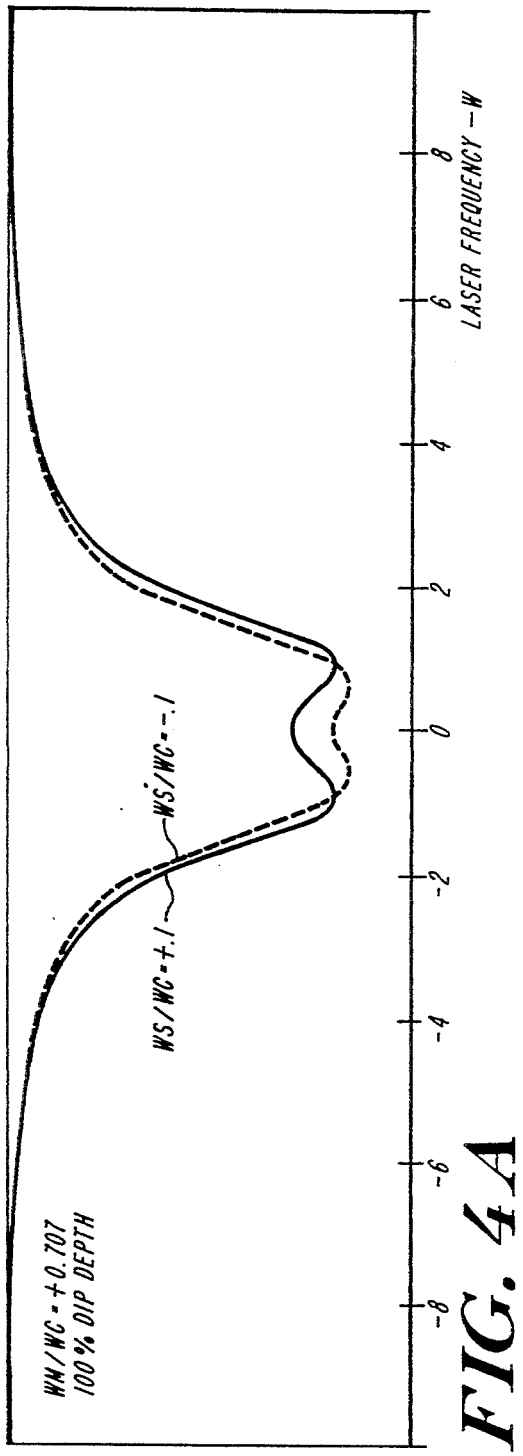
FIG. 4 is an illustration in graphical form of output signals produced by the gyroscope of FIG. 1 with specific conditions of angular rotation and phase modulation.
Figure 4B:
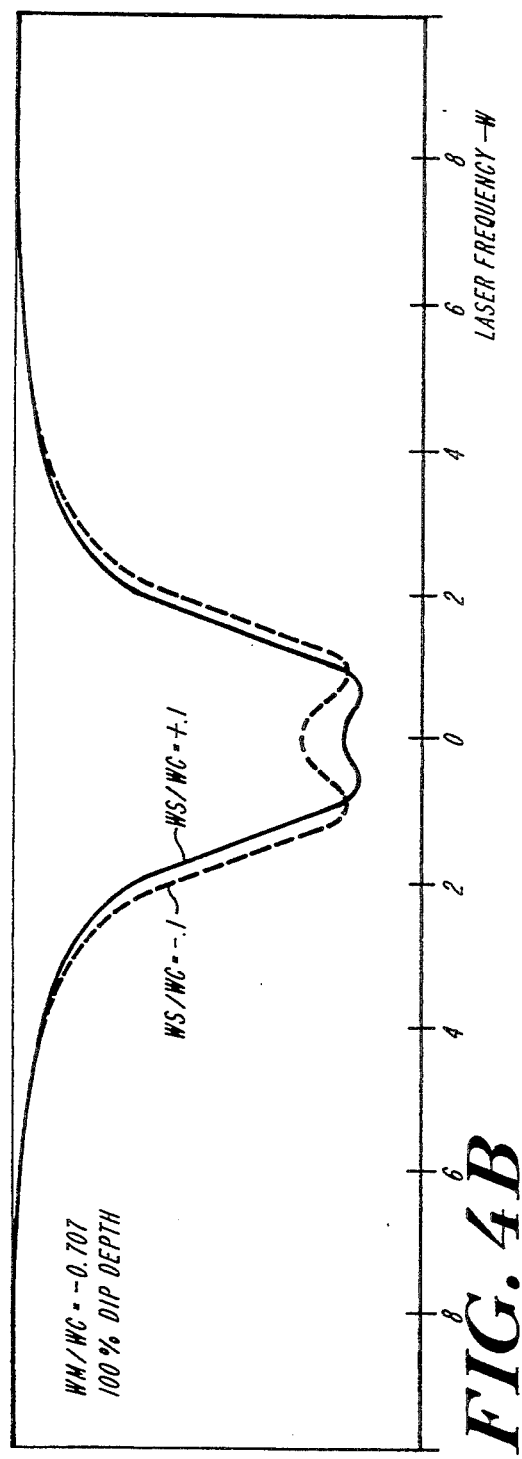

In FIG. 4a there is illustrated the light intensity at the photodetector as a function of laser frequency $\omega$ for the modulation condition where the modulation frequency $\omega_m = 0.707$ times the resonant ring cavity half width $\omega_c$. In FIG. 4a the solid line corresponds to a Sagnac frequency shift $+0.1\omega_c$ while the dotted line corresponds to a Sagnac shift $\omega_S$ equal to $-0.1\omega_c$. In the graph 4b the serrodyne frequency shift is set to be equal to $-0.707$ times $\omega_c$. As shown the curves are interchanged in FIG. 4b from those of FIG. 4a.

In operation the gyroscope is operated for a first period of time with a frequency shift of $+f_m$ and then at a second equal period at a frequency $-f_m$. The carrier intensity difference is then synchronously demodulated at demodulation circuit 26 to produce a difference signal $I(+f_m) - I(-f_m)$. This difference signal is taken when the laser frequency is locked at the dip center frequency.

Laser frequency tracking is an essential requirement of the RIFOG operation. It is done by driving the phase modulator 25 in FIG. 1 with a voltage $V_c$ according to:

$$V_c = v_{cm} \cdot sqr(\omega_{cm} t) \quad (3)$$

where $sqr(\omega_{cm} t)$ is a square wave of period $2\pi/\omega_{cm}$ (subscript cm refers to common mode modulation before the laser guided wave is divided into clockwise and counterclockwise components).

In FIG. 5a there is shown in graphical form the inphase intensity of the demodulated signal from the photodetector without any ring rotation. It is this inphase demodulated signal which is used as the locking discriminate in the laser frequency tracking. In FIG. 5a the modulation frequency fm is equal to 0.707 times $\omega_c$. The depth of modulation is minimized, being just sufficient to maintain locking, thereby leaving a maximum signal at the carrier frequency to be used for detecting the Sagnac frequency shift as illustrated in FIG. 4. FIG. 5b illustrates the quadrature intensity of the demodulated signal with no rotation.

The phase shift of both the serrodyne and the tracking modulations can be digitally implemented. Also, although the embodiment is shown with the tracking modulation occurring at modulator 25, this modulation could be accomplished by applying the signal at both of the phase modulators 21 and 22.

The invention having been described, it will be realized that alternative embodiments and variations may be employed.

What is claimed is:

1. A resonant interferometric fiber optic gyroscope for sensing angular rotation comprising,
   a fiber optic ring,
   a laser source emitting an output beam of coherent light at a frequency corresponding to a resonant frequency of said fiber optic ring,
   optical guide means optically coupled to said laser source and to said fiber optic ring for splitting the output beam from said laser source into two beams of substantially equal intensity, a first one of said split beams being propagated around said fiber optic ring in a first direction and a second one of said split beams being propagated around said fiber optic ring in the opposite direction,
   a photodetector coupled to said fiber optic ring for sensing a portion of said propagated beams extracted from said fiber optic ring, said fiber optic ring having a half wave resonance frequency $\omega_c$, said laser beam being emitted from said laser source at a frequency $\omega$,
   a first modulator positioned to modulate said first one of said split beams, first means for applying to said first modulator for a first period of time a signal that will produce a frequency shift $+\omega_m$, a second modulator positioned to modulate said second one of said split beams, second means for applying to said second modulator for said first period of time a signal that will produce a frequency shift of $-\omega_m$, wherein after said modulators are operated for said first period of time, they are operated for an approximately equal second period of time, with signals such that said first modulator produces a frequency shift of $-\omega_m$, and said second modulator produces a frequency shift of $+\omega m$, and wherein the difference at said photodetector between the signals for said first and second periods of time is used as a measure of the angular rate of rotation of said ring.

2. A resonant interferometric fiber optic gyroscope for sensing angular rotation comprising, a fiber optic ring, a laser source emitting an output beam of coherent light at a frequency corresponding to a resonant frequency of said fiber optic ring, optical guide means optically coupled to said laser source and to said fiber optic ring for splitting the output beam from said laser source into two beams of substantially equal intensity, a first one of said split beams being propagated around said fiber optic ring in a first direction and a second one of said split beams being propagated around said fiber optic ring in the opposite direction, a photodetector coupled to said fiber optical guide means for sensing a portion of said propagated beams extracted from said fiber optic ring, said fiber optic ring having a half wave resonance frequency $\omega_c$, said laser beam being emitted from said laser source at a frequency $\omega$, a first modulator positioned to phase modulate said first one of said split light beams, means for applying to said first modulator a modulating voltage of the form $V_d = V_k \cdot F(\omega_m t)$, where $V_k$ is a reference voltage, $\omega_m$ the modulation frequency, and F is a regular periodic function, a second modulator, means for applying a modulating voltage to said second modulator wherein the form of the applied voltage is the same as for the first modulator and the polarity is opposite, wherein said modulators are operated with the modulator input $V_k$ positive for a first period of time and with an equal modulator input $V_k$ negative for a second equal period of time, and wherein the difference at said photodetector between the signals for said first and second periods of time is used as a measure of the angular rate of rotation of said ring.

3. A fiber optic gyroscope in accordance with claim 2 wherein $V_k \cdot F(\omega_m t) = V_k \cdot \text{ser}(\omega_m t)$.

4. A fiber optic gyroscope in accordance with claim 1 wherein said optical guide means includes a light waveguide having first and second input ports and first and second output ports, said waveguide operating to divide a light beam coupled to one of its input ports into two equal intensity light beams, each provided at one of said output ports, said first output port being coupled to said fiber optic ring to provide propagation of said laser light beam in one direction around said fiber optic ring, and the other of said output ports being coupled to said fiber optic ring to provide propagation of said laser beam around said fiber optic ring in the opposite direction, and wherein said photodetector is coupled to the second one of said input ports and provides an electrical output signal indicative of the intensity and time variance of the optical beam incident upon it.

5. A fiber optic gyroscope in accordance with claim 1 and further including means for maintaining the output frequency of said laser source at a frequency corresponding to a characteristic resonant frequency of said fiber optic ring when rotation is zero.

6. A fiber optic gyroscope in accordance with claim 5 and wherein said means for maintaining the output frequency of said laser includes, a third phase modulator positioned to modulate said laser output beam before splitting according to the form, $$V_c = V_{cm} \cdot p(\omega_{cm} t)$$

where $p(\omega_{cm} t)$ is a periodic wave of period $2\pi/\omega_{cm}$ (the subscript cm referring to the common mode modulation of the laser beam before division) and a means for demodulating the signal from said photodetector, the in phase component of the demodulated signal serving as the lock in discriminate for controlling said laser frequency.

7. A gyroscope in accordance with claim 4 where said periodic wave is a square wave.

8. A gyroscope in accordance with claim 4 where said periodic wave is a sine wave.

9. A method of measuring the angular rate of rotation of a fiber optic ring comprising the steps of;

(1) generating a laser beam at a frequency corresponding to a characteristic resonant frequency of said fiber optic ring;

(2) splitting said laser beam into two equal intensity beams;

(3) coupling one of said split laser beams into said fiber optic ring to propagate in a first direction around said ring;

(4) coupling the other of said split laser beams into said fiber optic ring to propagate in the opposite direction around said ring, (5) recombining said counterpropagated beams after emerging from said fiber optic ring and providing a portion of said recombined optical beams to a photodetector;

(6) modulating for a first period of time one of said split beams, before it is coupled into said fiber optic ring, with a modulating signal that will produce a frequency shift $+\omega_m$;

(7) modulating for a second period of time, substantially equal to the first, the other of said split beams before it is coupled into said fiber optic ring with a signal that will produce a frequency shift of $-\omega_m$; and (8) taking the difference between the photodetector output signals for said first period of time and for said second period of time as a measure of the rate of rotation of said fiber optic ring.

10. A method of measuring the angular rate of rotation of a fiber optic ring comprising the steps of;

(1) generating a laser beam at a frequency corresponding to a characteristic resonant frequency of said fiber optic ring;

(2) splitting said laser beam into two substantially equal intensity beams;

(3) coupling one of said split laser beams into said fiber optic ring to propagate in a first direction around said ring;

(4) coupling the other of said split laser beams into said fiber optic ring to propagate in the opposite direction around said ring, (5) recombining said counterpropagated beams after emerging from said fiber optic ring and providing a portion of said recombined optical beams to a photodetector;

(6) modulating one of said split beams before it is coupled into said fiber optic ring with a modulating voltage of the time waveform, $$V_d = V_k \cdot ser(\omega_m t),$$

where $V_k$ is a reference voltage and $\omega_m$ is the modulating frequency;

(7) modulating the other of said split beams, before it is coupled into said fiber optic ring, with a voltage of opposite polarity and the same time waveform;

(8) applying the modulating voltages with $V_k$ positive for a first period of time and with $V_k$ negative for a second equal period of time, and (9) taking the difference between the photodetector output signals for said first period of time and for said second period of time as a measure of the rate of rotation of said fiber optic ring.

11. A method in accordance with claim 10 and further including the step of tracking the frequency of said laser to the cavity chamber resonance frequency of said ring, wherein said difference signal is taken when said laser is tracking.

12. A method in accordance with claim 11 wherein said tracking is accomplished by modulating said laser output beam before splitting with a modulating voltage of the form $$V_C = V_m \cdot p(\omega_{cm} t)$$

where $p(\omega_{cm} t)$ is a periodic wave of period $2/\pi_{cm}$ (the subscript cm referring to a common mode modulator of the laser beam before splitting).

13. A method in accordance with claim 12 where p is a square wave.

* * * * *